United States Patent
Seo et al.

(10) Patent No.: US 9,282,558 B2
(45) Date of Patent: Mar. 8, 2016

(54) METHOD FOR TRANSMITTING AND RECEIVING SIGNAL USING TIME DIVISION DUPLEX MODE IN WIRELESS ACCESS SYSTEM, AND APPARATUS THEREFOR

(71) Applicant: LG ELECTRONICS INC., Seoul (KR)

(72) Inventors: Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 14/370,932

(22) PCT Filed: Jan. 7, 2013

(86) PCT No.: PCT/KR2013/000083
§ 371 (c)(1),
(2) Date: Jul. 7, 2014

(87) PCT Pub. No.: WO2013/103270
PCT Pub. Date: Jul. 11, 2013

(65) Prior Publication Data
US 2015/0312905 A1    Oct. 29, 2015

Related U.S. Application Data

(60) Provisional application No. 61/583,615, filed on Jan. 6, 2012.

(51) Int. Cl.
*H04B 7/02* (2006.01)
*H04W 72/04* (2009.01)
(Continued)

(52) U.S. Cl.
CPC ....... *H04W 72/0446* (2013.01); *H04B 7/15557* (2013.01); *H04B 7/2656* (2013.01); *H04W 52/243* (2013.01)

(58) Field of Classification Search
CPC .......... H04B 7/02; H04B 7/022; H04B 7/024; H04B 7/026; H04B 7/0404; H04B 7/0413; H04B 7/0452; H04B 7/0495; H04B 7/0608; H04L 5/0032; H04J 11/0053; H04J 11/0056

USPC ................ 370/208, 281, 280, 315, 328–330, 370/336–338; 455/509–510, 447, 450, 455/63.1, 525
See application file for complete search history.

(56) References Cited

U.S. PATENT DOCUMENTS 6,611,507 B1    8/2003  Hottinen et al.
7,295,536 B2 *  11/2007 Refai ................... H04W 36/18
                                                   370/331
(Continued)

FOREIGN PATENT DOCUMENTS

JP       2011-250442 A    12/2011
KR   10-2011-0073689 A     6/2011

OTHER PUBLICATIONS

Goldhamer et al., "Proposal for 802.16n Architecture with Path and Frequency Resilience," IEEE 802.16 Broadband Wireless Access Working Group <http://ieee802.org/16>, IEEE C802.16n-10-0068r, Jan. 11, 2011, 12 pages.

(Continued)

*Primary Examiner* — Charles C Jiang
*Assistant Examiner* — Mohamed Kamara
(74) *Attorney, Agent, or Firm* — Birch, Stewart, Kolasch & Birch, LLP

(57) ABSTRACT

Disclosed are a method for transmitting and receiving a signal according to a time division duplex mode by using the setting of multiple subframes for one cell in a wireless access system, and an apparatus for supporting the same. According to one embodiment of the present invention, a method for transmitting and receiving a signal of a base station using a time division duplex (TDD) mode in a wireless access system may comprise the steps of: determining the setting of a first subframe allocated to a first terminal and the setting of a second subframe allocated to a second terminal, among the setting of multiple subframes operating at one carrier frequency; transmitting information indicating the first terminal and the second terminal, respectively; and receiving a signal from the first terminal according to the first subframe setting while transmitting a signal to the second terminal according to the second subframe setting.

15 Claims, 10 Drawing Sheets

(a) First time point (b) Second time point

(51) Int. Cl.
*H04B 7/155* (2006.01)
*H04B 7/26* (2006.01)
*H04W 52/24* (2009.01)

(56) References Cited

U.S. PATENT DOCUMENTS

| | | | |
|---|---|---|---|
| 2009/0061715 A1* | 3/2009 | Evans | H04B 7/0602 442/301 |
| 2009/0249153 A1* | 10/2009 | Zhang | H04L 1/1887 714/748 |
| 2012/0106404 A1* | 5/2012 | Damnjanovic | H04L 5/001 370/279 |
| 2012/0257554 A1 | 10/2012 | Kim et al. | |
| 2013/0044652 A1* | 2/2013 | Wang | H04L 1/08 370/380 |

OTHER PUBLICATIONS

Nokia Siemens Networks et al., "Views on Inter-Band CA with Different TDD Configurations on Different Bands," 3GPP TSG-RAN WG1 Meeting #66bis, Agenda Item 7.2.1.5, R1-113136, Oct. 10-14, 2011, Zhuhai, China, 5 pages.

Renesas Mobile Europe Ltd., "HARQ Procedure for Half Duplex Mode in CC Specific TDD Configuration," 3GPP TSG-RAN WG1 Meeting #67, Agenda Item 7.2.1.5, R1-113887, Nov. 14-18, 2011, San Francisco, California, USA, 6 pages.

* cited by examiner

FIG. 7
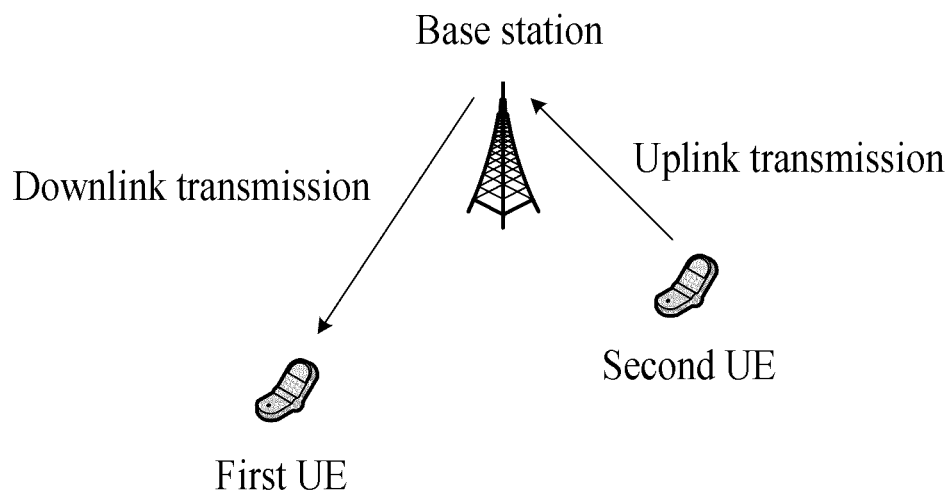
(a) First time point
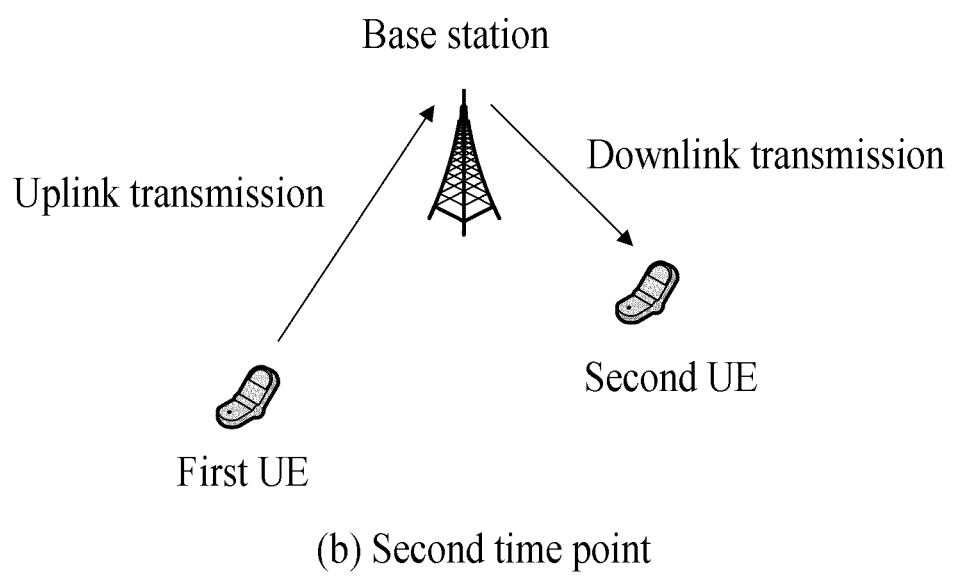
(b) Second time point

METHOD FOR TRANSMITTING AND RECEIVING SIGNAL USING TIME DIVISION DUPLEX MODE IN WIRELESS ACCESS SYSTEM, AND APPARATUS THEREFOR

CROSS REFERENCE TO RELATED APPLICATIONS

This application is the National Phase of PCT International Application No. PCT/KR2013/000083, filed on Jan. 7, 2013, which claims priority under 35 U.S.C. 119(e) to U.S. Provisional Application No. 61/583,615, filed on Jan. 6, 2012, all of which are hereby expressly incorporated by reference into the present application.

FIELD OF THE INVENTION

The present invention relates to a wireless access system and, most particularly, to a method for transmitting and receiving a signal according to a TDD (Time Division Duplex) mode by using multiple subframe configurations with respect to one cell in a wireless access system, and a device for supporting the same.

BACKGROUND ART

The mobile communication system has been developed to ensure activity of the user and to provide audio services. However, the mobile communication system has gradually evolved from not only providing audio services but to providing data services as well, and, recently, the mobile communication system has evolved up to an extent of providing high speed data services. However, in the mobile communication system currently providing services, due to a lack of resources and the users' increasing demand for service provision at a higher speed, a more evolved mobile communication system is being required.

In the requirements for a next generation mobile access system, one of the most important factors is to being capable of supporting a required capacity for a higher data transmission rate. For this, diverse technologies, such as MIMO (Multiple Input Multiple Output), CoMP (Cooperative Multiple Point transmission), relay, and so on, are being researched and developed.

In the related art wireless access system, a time division duplex (TDD) mode is operated by differentiating the time resources to uplink and downlink, and the TDD mode has been operated as a half duplex mode, wherein only one of signal transmission and signal reception is performed at a specific time point. In this situation, in order to extend the range of application of radio resources, the base station is being required to be operated in a full duplex mode, wherein signal reception and signal transmission are performed simultaneously.

DETAILED DESCRIPTION OF THE INVENTION

Technical Objects

An object of the present invention is to propose a wireless access system and, preferably, a method for transmitting and receiving a signal according to a full-duplex TDD (Time Division Duplex) mode by using multiple subframe configurations with respect to one cell in a wireless access system, and a device for supporting the same.

Additionally, an object of the present invention is to propose a wireless access system and, preferably, a method for transmitting and receiving a signal according to a full-duplex TDD (Time Division Duplex) mode in order to extend an application range of radio (or wireless) resources in a wireless access system, and a device for supporting the same.

The effects of the present invention will not be limited only to the technical objects described above. Accordingly, technical objects that have not been mentioned above or additional technical objects of the present application may become apparent to those having ordinary skill in the art from the description presented below.

Technical Solutions

In order to resolve the above-described technical objects, a method of a base station for transmitting and receiving a signal by using a Time Division Duplex (TDD) mode in a wireless access system according to an exemplary embodiment of the present invention may include the steps of deciding a first subframe configuration allocated to a first user equipment and a second subframe configuration allocated to a second user equipment, among multiple subframe settings operating in a single carrier frequency; transmitting information respectively indicating the first subframe configuration and the second subframe configuration to the first user equipment and the second user equipment; and receiving a signal from the first user equipment with respect to the first subframe configuration and simultaneously transmitting a signal to the second user equipment with respect to the second subframe configuration.

Information indicating the first subframe configuration may be transmitted through a system information block (SIB) and is provided to a legacy user equipment.

The radio resource measurement (RRL) and radio link monitoring (RLM) may be set up to be performed only in a subframe designated as a downlink subframe in the first subframe configuration.

The second subframe configuration may be decided as an uplink only in a subframe decided as an uplink in the first subframe configuration.

The step of transmitting a signal to the second user equipment may include a step of reducing transmission power of a signal being transmitted to the second signal.

The method for transmitting and receiving a signal may further include a step of removing interference caused by a signal being transmitted to the second user equipment to interfere with a signal being received from the first user equipment.

The step of removing interference may include a step of reducing a signal being transmitted to the second user equipment from a signal received from the first user equipment.

The step of transmitting information may include a step of including an indicator indicating one of the first subframe configuration and the second subframe configuration to downlink control information (DCI) and transmitting the processed information.

The method for transmitting and receiving a signal may further include a step of transmitting a signal to the first user equipment with respect to the first subframe configuration and simultaneously receiving a signal from the second user equipment with respect to the second subframe configuration.

The method for transmitting and receiving a signal may further include a step of performing scheduling so as to position the first user equipment and the second user equipment at remote distances from one another.

The method for transmitting and receiving a signal may further include the steps of deciding subframes being set up as downlink in both the first subframe configuration and the second subframe configuration as a first subframe group; deciding subframes being set up as downlink in any one of the first subframe configuration and the second subframe configuration as a second subframe group; and transmitting information indicating channel state information measurement to be separately performed in the first subframe group and the second subframe group to the first user equipment and the second user equipment.

A base station configured to transmit and receive a signal by using a Time Division Duplex (TDD) mode in a wireless access system according to another exemplary embodiment of the present invention may include an RF (Radio Frequency) unit configured to transmit and receive a radio signal; and a processor configured to control the base station including the RF unit, wherein the processor may be configured to decide a first subframe configuration allocated to a first user equipment and a second subframe configuration allocated to a second user equipment, among multiple subframe settings operating in a single carrier frequency, to transmit information respectively indicating the first subframe configuration and the second subframe configuration to the first user equipment and the second user equipment, and to receive a signal from the first user equipment with respect to the first subframe configuration and to simultaneously transmit a signal to the second user equipment with respect to the second subframe configuration.

Information indicating the first subframe configuration may be transmitted through a system information block (SIB) and is provided to a legacy user equipment.

The radio resource measurement (RRL) and radio link monitoring (RLM) may be set up to be performed only in a subframe designated as a downlink subframe in the first subframe configuration.

The second subframe configuration may be decided as an uplink only in a subframe decided as an uplink in the first subframe configuration.

Advantageous Effects

In case of following the above-described exemplary embodiment of the present invention, a wireless access system and, preferably, a method for transmitting and receiving a signal according to a full-duplex TDD (Time Division Duplex) mode by using multiple subframe configurations with respect to one cell in a wireless access system, and a device for supporting the same may be provided.

Additionally, in case of following the above-described exemplary embodiment of the present invention, an application range of radio (or wireless) resources may be extended by using a wireless access system and, preferably, a method for transmitting and receiving a signal according to a full-duplex TDD (Time Division Duplex) mode in a wireless access system, and a device for supporting the same.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

FIG. 7 illustrates a signal transmission and reception of the full duplex time division duplex mode of a base station according to an exemplary embodiment of the present invention.

BEST MODE FOR CARRYING OUT THE PRESENT INVENTION

Figure 1:
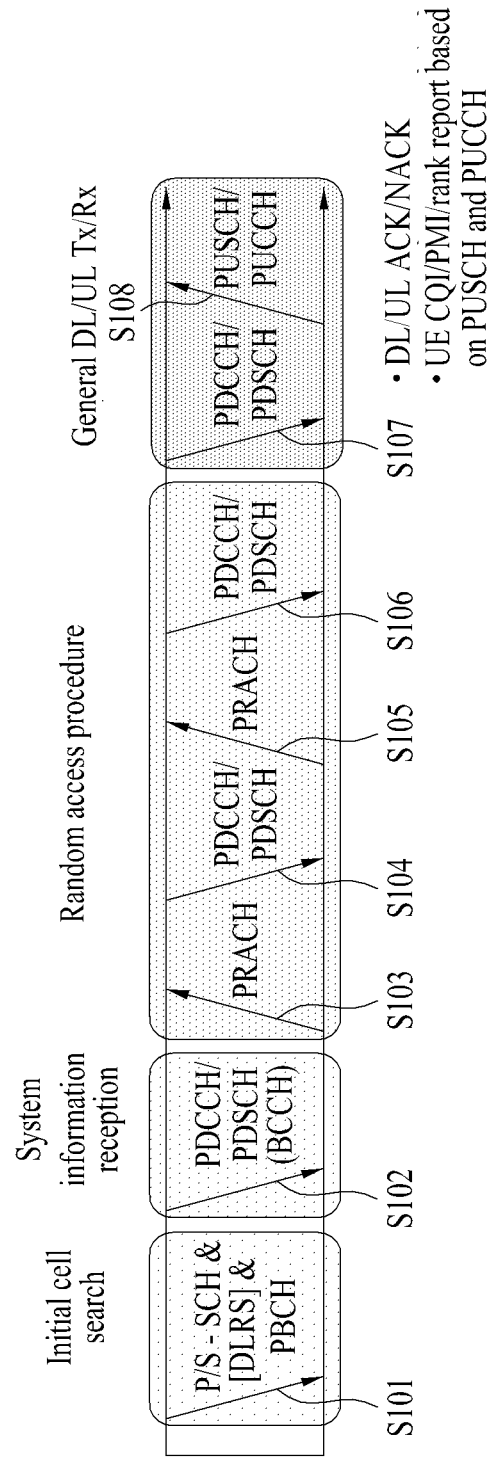
FIG. 1 illustrates physical channels that are used in a 3GPP LTE system and a general signal transmitting method using the same.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. Additionally, the term 'Terminal' may be replaced by terms including UE (User Equipment), MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, D2D device (Device-to-Device) device, and so on.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention, may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Nevertheless, the technical features of the present invention will not be limited only to those of the 3GPP LTE/LTE-A systems.

1. 3GPP LTE/LTE-A System to which the Present Invention can be Applied 1. 1. General System FIG. 1 illustrates physical channels that are used in a 3GPP LTE system and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a P-SCH (Primary Synchronization Channel) and an S-SCH (Secondary Synchronization Channel) from the base station so as to be in synchronization with the base station, and the user equipment may also acquire information, such as cell ID.

Thereafter, the user equipment may receive a PBCH (Physical Broadcast Channel) so as to acquire broadcast information within the cell. Meanwhile, the user equipment may receive DL RS (Downlink Reference Signal), in the step of initial cell search, so as to verify the downlink channel status.

The user equipment that has completed the initial cell search may receive a PDCCH (Physical Downlink Control Channel) and a PDSCH (Physical Downlink Shared Channel) based upon the PDCCH (Physical Downlink Control Channel) information, in step S102, so as to acquire more detailed system information.

Thereafter, in order to complete the access to the base station, the user equipment may perform a Random Access Procedure, such as in steps S103 and S106 of a later process, so as to complete the access to the base station. In order to do so, the user equipment transmits a preamble through a PRACH (Physical Random Access Channel) (S103), and then the user equipment may receive a response message respective to the random access through the PDCCH and its respective PDSCH (S104). In case of a contention based random access, the user equipment may perform Contention Resolution Procedures, such as transmitting an additional Physical Random Access Channel (PRACH) signal (S105) and receiving a Physical Downlink Control Channel (PDCCH) signal and a Physical Downlink Shared Channel (PDSCH) signal corresponding to the PDCCH signal (S106).

After performing the above-described procedures, the user equipment may receive a Physical Downlink Control Channel (PDCCH) signal and/or Physical Downlink Shared Channel (PDSCH) signal (S107), as a general uplink/downlink signal transmission procedure, and may then perform PUSCH (Physical Uplink Shared Channel) signal and/or PUCCH (Physical Uplink Control Channel) signal transmission (S108).

The control information being transmitted by the user equipment to the base station is collectively referred to as UCI (Uplink Control Information). The UCI may include HARQ ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and so on.

In the LTE system, the UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 2:
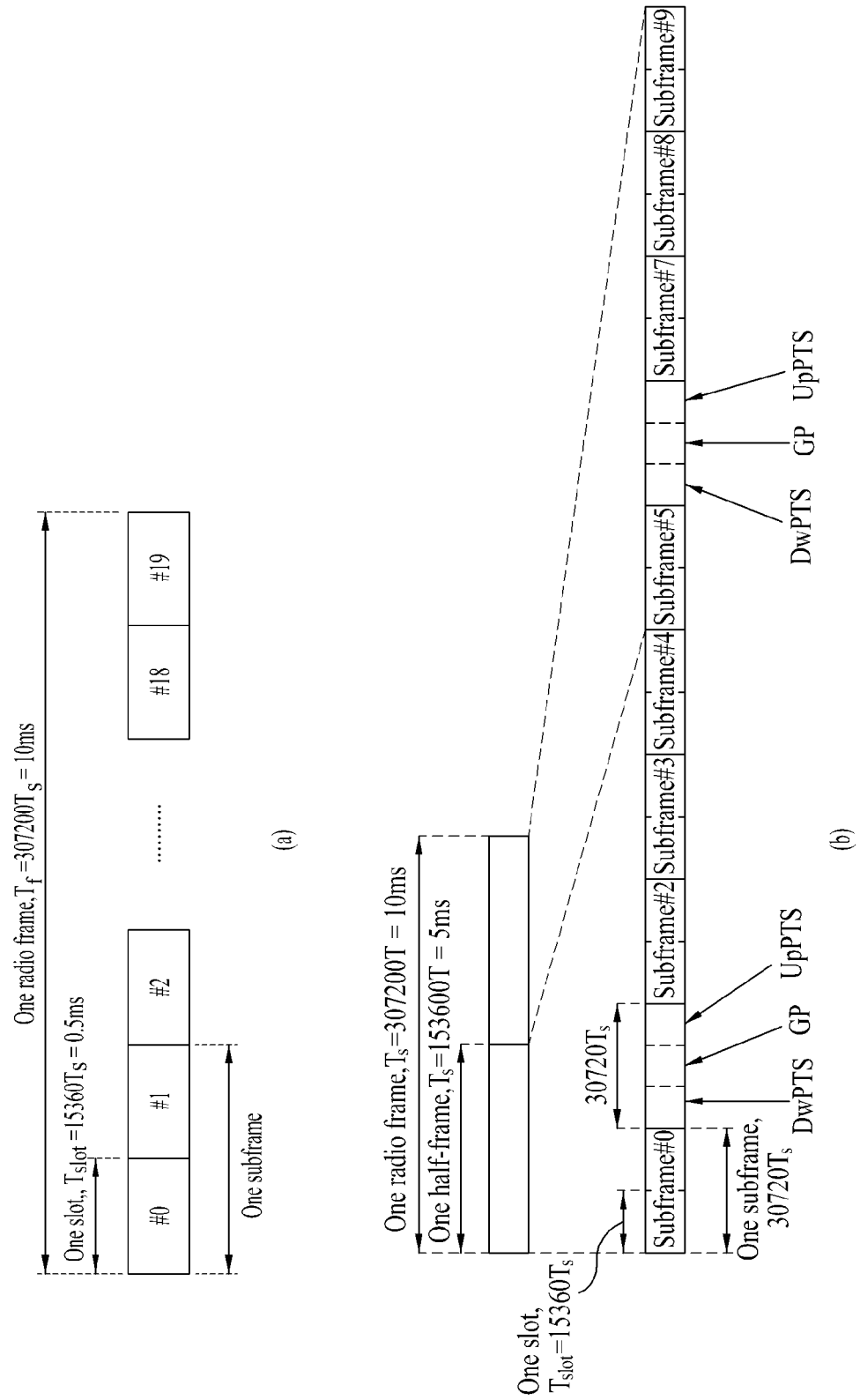
FIG. 2 illustrates a structure of a wireless frame being used in 3GPP LTE.

FIG. 2 illustrates a structure of a wireless frame being used in 3GPP LTE.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE uses the OFDMA in a downlink, an OFDM symbol is used to indicate one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 2 illustrates an exemplary structure of a type 2 radio frame. The type 2 radio frame consists of 2 half frames, and each half frame is configured of 5 general subframes and a DwPTS (Downlink Pilot Time Slot), a Guard Period (GP), and a UpPTS (Uplink Pilot Time Slot), wherein 1 subframe is configured of 2 slots. The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

In the Type 2 frame structure of the TDD system, an uplink-downlink configuration refers to a rule indicating whether or not downlink and uplink are being allocated (or reserved) with respect to all subframes. Table 1 shows the uplink-downlink configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of a radio frame, "D" represents a subframe designated for downlink transmission, "U" indicates a subframe designated for uplink transmission, and "S" corresponds to a special subframe consisting of 3 different fields, such as DwPTS, GP, and UpPTS. The uplink-downlink configuration may be divided into 7 different types, and for each configuration, the positions and/or number of downlink subframes, special subframes, uplink subframes vary.

A time point when a downlink is switched to an uplink or a time point when an uplink is switched to a downlink is referred to as a switching point. A switch-point periodicity refers to a periodicity (or cycle period) of the switching between an uplink subframe and a downlink subframe being repeated identically, and 5 ms or 10 ms is supported. In case of having a 5 ms uplink-to-downlink switch-point periodicity, the special subframe (S) exists in each half-frame, and, in case of having a 5 ms uplink-to-downlink switch-point periodicity, the special subframe (S) exists only in a first half-frame.

In all configurations, subframes No. 0, No. 5 and DwPTS collectively correspond to a section designated only for downlink transmission, and a subframe immediately following the UpPTS and subframe subframe corresponds to a section always designated for uplink transmission.

Such uplink-downlink configuration corresponds to system information that is known to both the base station and the user equipment. Each time the uplink-downlink configuration information is changed, the base station may notify the user equipment of a change in the uplink-downlink allocation status of the radio frame by transmitting only the index of the configuration information. Additionally, as a type of downlink control information, the configuration information may be transmitted through a PDDCH (Physical Downlink Control Channel) just as other scheduling information, and, as broadcasting information, the configuration information may also be commonly transmitted to all user equipments within the cell through a broadcast channel.

The above-described structure of the radio frame is merely exemplary. And, therefore, the number of subframes included in the radio frame or the number of slots included in a subframe, and the number of symbols included in one slot may be diversely varied.

Figure 3:
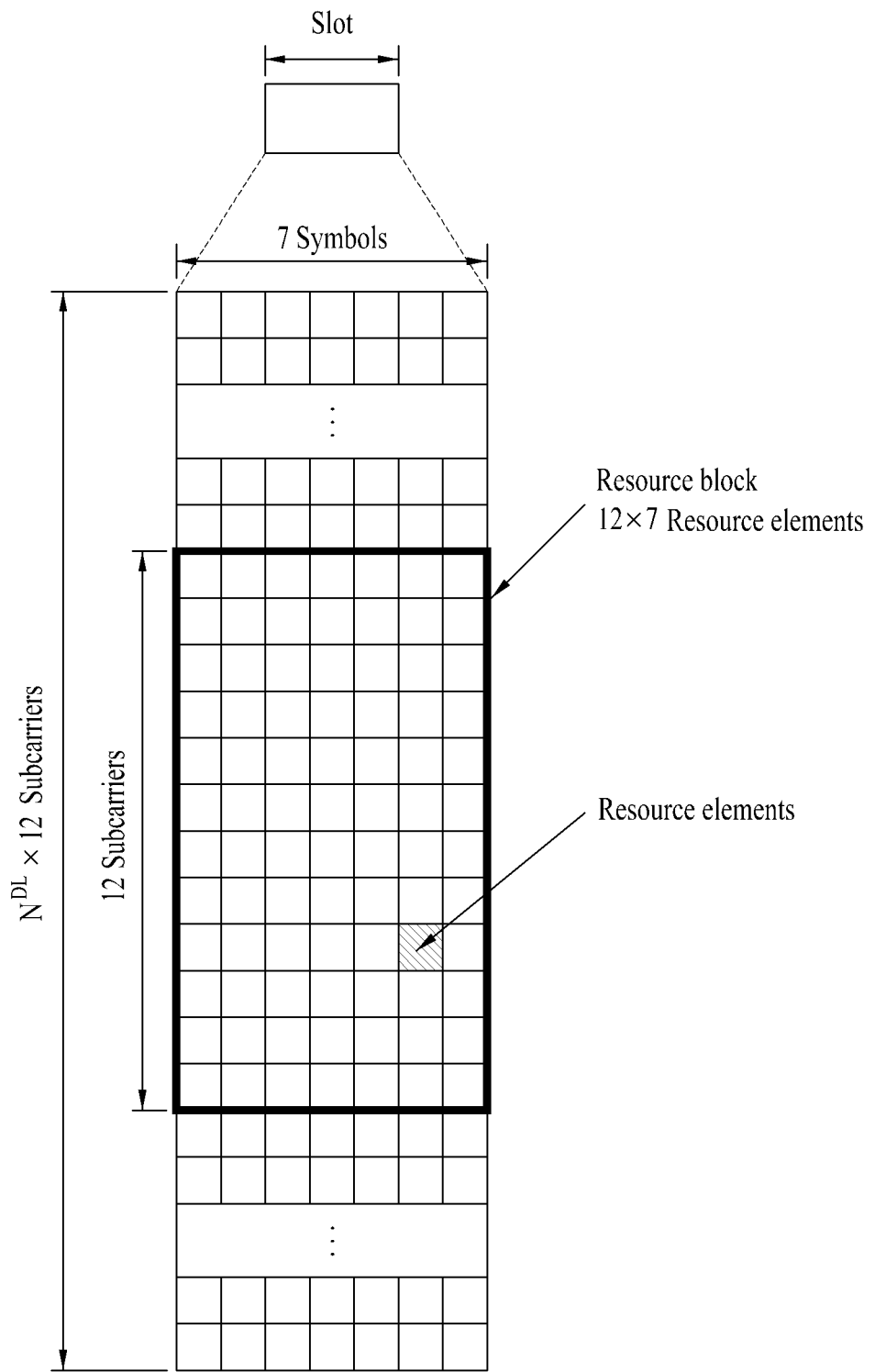
FIG. 3 illustrates an exemplary resource grid of a downlink slot.

FIG. 3 illustrates an exemplary resource grid of a downlink slot.

Referring to FIG. 3, a downlink slot includes multiple OFDM symbols in the time domain. Herein, one downlink slot may include 7 OFDM symbols in a time domain, and a resource block (RB) may include 12 sub-carriers in the frequency domain. Although this may be described as an example, the present invention will not be limited only to this.

Each element within the resource grid is referred to as a Resource Element (RE). One resource block includes 12×7 resource elements. NDL, which corresponds to a number of resource blocks included in a downlink slot, is dependent to a downlink transmission bandwidth. The structure of an uplink slot may be identical to the structure of the downlink slot.

Figure 4:
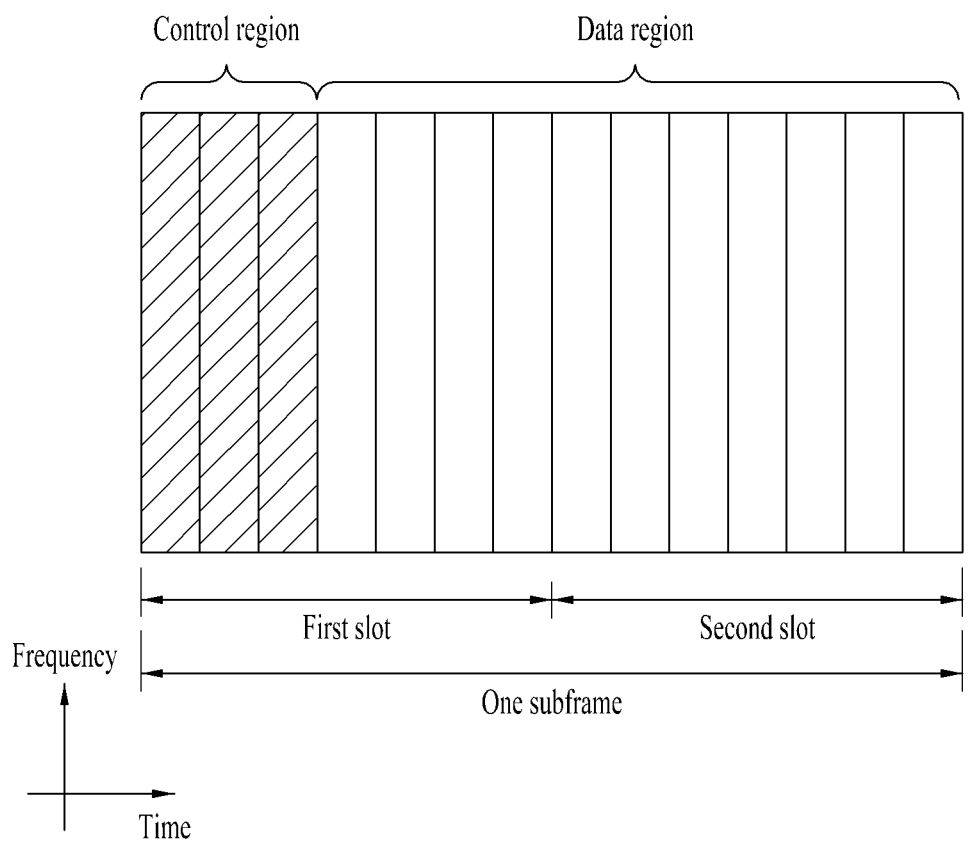
FIG. 4 illustrates a structure of a downlink subframe.

FIG. 4 illustrates a structure of a downlink subframe.

Referring to FIG. 4, a maximum of 3 OFDM symbols located at the front portion (or beginning) of a first slot within one subframe collectively corresponds to a control region, wherein a control channel is allocated (or assigned), and the remaining OFDM symbols collectively correspond to a data region, wherein a PDSCH (Physical Downlink Shared Channel) is assigned. Examples of the downlink control channels that are being used in the LTE system may include a PCFICH (Physical Control Format Indicator Channel), a PDCCH (Physical Downlink Control Channel), a PHICH (Physical Hybrid automatic repeat request Indicator Channel), and so on.

The PCFICH is transmitted from a first OFDM symbol of the subframe, and the PCFICH carries information on the number of OFDM symbols (i.e., size of the control region), which are being used for the transmission of control channels within the subframe. The PHICH corresponds to a response channel respective to the uplink, and the PHICH may carry an ACK (Acknowledgment)/NACK (Not-Acknowledgment) signal respective to an HARQ (Hybrid Automatic Repeat Request). The control information being transmitted through the PDCCH may be referred to as downlink control information (DCI). Herein, the DCI may include uplink resource allocation information, downlink resource allocation information, or an uplink transmission (Tx) power control command respective to an arbitrary user equipment group.

The PDCCH may carry resource allocation and transmission format of a DL-SCH (Downlink Shared Channel) (this is also referred to as a downlink grant.), resource allocation information of an UL-SCH (Uplink Shared Channel) (this is also referred to as an uplink grant.), paging information of a PCH (Paging Channel), system information of the DL-SCH, resource allocation respective to an upper-layer control message, such as a random access response, that is being transmitted over the PDSCH, a collection (or group) of transmission power control commands on individual user equipments within the random user equipment group, information on the activation of a Voice over IP (VoIP), and so on. Multiple PDCCHs may be transmitted within the control region, and, the user equipment may monitor the multiple PDCCHs. Herein, the PDCCH is configured of a collection of one CCE or multiple consecutive CCEs (control channel elements). A CCE corresponds to a logical allocation unit used for providing a PDCCH with a coding rate in accordance with a wireless channel state. Herein, the CCE corresponds to a plurality of resource element groups. The number of formats and available number of bits of a PDCCH may be decided based upon a correlation between the number of CCEs and the coding rate provided by the CCEs.

The base station decides a PDCCH format in accordance with the DCI that is to be transmitted to the user equipment and adds a CRC (Cyclic Redundancy Check) to the control information. Depending upon the owner or purpose of the PDCCH, a unique identifier (this is referred to as an RNTI (Radio Network Temporary Identifier (RNTI).) may be masked to the CRC. In case of a PDCCH for a particular user equipment, a unique identifier of the user equipment, e.g., a C-RNTI (Cell-RNTI) may be masked to the CRC. Alternatively, in case of a PDCCH for a paging message, a paging indicator identifier, e.g., P-RNTI (Paging-RNTI) may be masked to the CRC. In case of a PDCCH for system information and, more particularly, for a system information block (SIB), a system information identifier, SI-RNTI (system information RNTI) may be masked to the CRC. In order to indicate a random access response, which corresponds to a response to the transmission of a random access preamble of the user equipment, a RA-RNTI (random access-RNTI) may be masked to the CRC.

Figure 5:
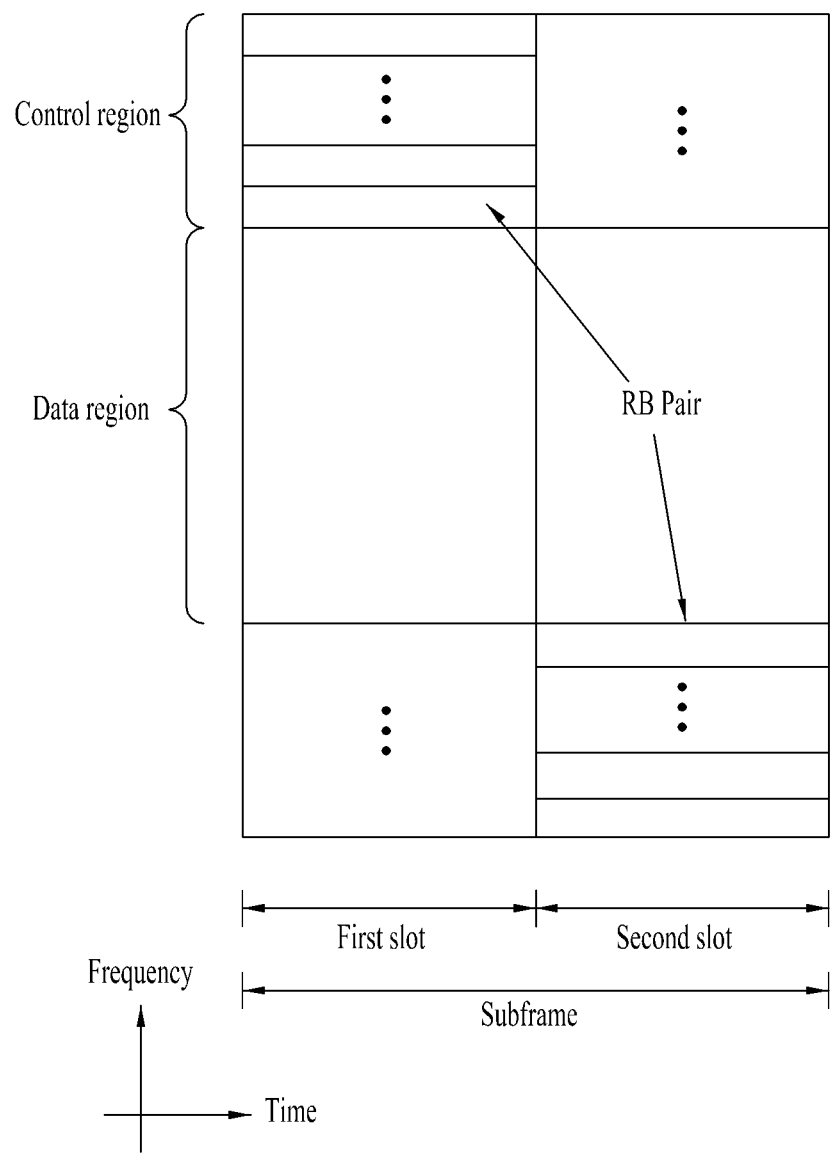
FIG. 5 illustrates a structure of an uplink subframe.

FIG. 5 illustrates a structure of an uplink subframe.

Referring to FIG. 5, a UL subframe may be divided into a data region and a control region in the frequency domain. A PUCCH (Physical Uplink Control Channel), which carries uplink control information, is allocated to the control region. And, a PUSCH (Physical Uplink Shared Channel), which carries user data, is allocated to the data region. In order to maintain the characteristics of a single carrier, one user equipment does not transmit a PUCCH and a PUSCH at the same time. A PUCCH respective to a user equipment is allocated with an RB pair in a subframe. And, the RBs belonging to the RB pair occupy different subcarriers in two slots. This may also be described (or expressed) as the RB pair, which is allocated to the PUCCH, being frequency-hopped at a slot boundary.

1. 2. Downlink Measurement

In a wireless communication system, when a packet (or signal) is being transmitted, the transmitted packet is transmitted through a wireless (or radio) channel, Therefore, signal distortion may occur during the transmission process. In order to allow the receiving end to correctly (or properly) receive the distorted signal, the receiving end is required to use channel information, so as to compensate for the distortion in the received signal. In order to figure out the channel information, a general method used herein is to transmit a signal, which is known to both the receiving end and the transmitting end, and, then, to figure out the channel information by using a distortion degree, which occurs when the signal is received through the channel. Herein, the signal that is known to both the receiving end and the transmitting end is referred to as a Pilot Signal or a Reference Signal.

In case the transmitting end or the receiving end of the wireless communication system transceives (transmits/receives) by using multiple antennae in order to improve capacity enhancement and communication performance, the transmitting end or the receiving end should be aware of the channel status between each transmission antenna and reception antenna, in order to be capable of receiving the proper signal. Therefore, a separate reference signal should exist for each transmission antenna.

In the wireless communication system, the reference signal may be broadly divided into two different types with respect to its purpose. The reference signal may be divided into a reference signal having the purpose of acquiring (or gaining) channel information and a reference signal for demodulating data. Since the purpose of the former relates to allowing the user equipment to acquire channel information to a downlink, the information is required to be transmitted through a wideband, and, even in case of a user equipment that does not receive downlink data from a specific subframe, the corresponding subframe should be capable of receiving and measuring the corresponding reference signal. Additionally, such channel measurement specific reference signal may also be used for the measurement of handover, and so on. When the base station transmits a downlink signal, the latter corresponds to a reference signal that is transmitted along with the respective resource, and, herein, by receiving the corresponding reference signal, the user equipment may perform channel estimation, thereby being capable of demodulating data. Such demodulation specific reference signal should be transmitted to a region to which data are being transmitted.

In a 3GPP LTE system, as a downlink RS, a CRS (Common Reference Signal) shared by all UEs within a cell and a DRS (Dedicated Reference Signal) dedicated to only one specific-UE are defined. The CRS is being used for two different purposes of channel information acquisition and data demodulation, and the CRS is also referred to as a cell-specific reference signal (cell-specific RS), The base station transmits the CRS to each subframe while passing through the wideband. Conversely, the DRS is only used for the purpose of data demodulation, and, in case data demodulation within the PDSCH is being required, the DRS may be transmitted through resource elements. The user equipment may receive information on the presence or absence of the DRS through an upper layer, and the DRS is valid only when a corresponding PDSCH is mapped thereto. The DRS may also be referred to as a user equipment specific reference signal (UE-specific RS) or a DMRS (Demodulation RS).

The receiving end (UE) estimates the channel state from the CRS and feeds back an indicator associated with channel quality, such as a CQI (Channel Quality Indicator), a PMI (Precoding Matrix Index) and/or an RI (Rank Indicator), to the transmitting end (base station). Alternatively, an RS associated with the feedback of the CSI (Channel State Information), such as CQI/PMI/RI, may also be separately defined as a CSI-RS. Unlike the conventional (or generic) CRS that is being used for the purpose of channel measurement and data demodulation at the same time, the CSI-RS having the purpose of channel measurement is designed for a purpose focusing on channel measurement. As described above, since the CSI-RS is being transmitting only for the purpose acquiring information respective to the channel state, the base station transmits a CSI-RS respective to all antenna ports. Additionally, since the CSI-RS is being transmitted for the purpose of figuring out (or knowing) downlink channel information, unlike the DRS, the CSI-RS is transmitted to all bands.

In the current 3GPP LTE system, two different types of transmission methods, such as an open-loop MIMO, which is operated without any channel information of the receiving end, and a closed-loop MIMO, are defined, and, in the closed-loop MIMO, in order to acquire multiplexing gain of the MIMO antennae, each of the transmitting end and the receiving end performs beamforming based upon the channel information, i.e., CSI (Channel State Information). In order to acquire CSI from the user equipment, the base station allocates (or assigns) a PUCCH (Physical Uplink Control Channel) or a PUSCH (Physical Uplink Shared Channel), so as to command downlink CSI to be fed-back.

The CSI may be broadly divided into three different information types, such as RI (Rank Indicator), PMI (Precoding Matrix Index), CQI (Channel Quality Indicator).

The RI indicates rank information of a channel and signifies a number of signal streams (or layers) that can be received by the user equipment through the same frequency-time resource. Since this value is dominantly decided by long term fading of the channel, the RI may be fed-back to the base station at a generally longer interval as compared to PMI, CQI values.

As a value reflecting spatial characteristics (or features) of the channel, the PMI indicates a precoding index of the base station, which is preferred by the user equipment, based upon a metric reference, such as SINR (Signal to Interference plus Noise Ratio). More specifically, PMI corresponds to information respective to a precoding matrix, which is used for the transmission performed by the transmitting end. A precoding matrix being fed-back from the receiving end is decided based upon a number of layers, which is indicated by the RI. The PMI may be fed-back in case of a closed-loop spatial multiplexing (Spacial Multiplexing) and a large delay CDD transmission. In case of an open-loop transmission, the transmitting end may select a precoding matrix in accordance with a predecided rule. A process of the receiving end for selecting a PMI with respect to each rank will now be described. The receiving end calculates an SINR, which is processed earlier within respect to each PMI, then converts the calculated SINR to a sum capacity, thereby being capable of selecting the best PMI based upon the sum capacity. More specifically, the process performed by the receiving end for calculating the PMI may be referred to as a process of searching for the best PMI based upon the sum capacity. After receiving PMI feedback from the receiving end, the transmitting end may directly use the precoding matrix, which is recommended by the receiving end, without any modification, and such fact may be included in the data transmission scheduling allocation information, which is to be transmitted to the receiving end, as a 1-bit indicator. Alternatively, the transmitting end may not directly use the precoding matrix indicated by the PMI, which is fed-back from the receiving end. In this case, precoding matrix information, which is used by the transmitting end for performing data transmission to the receiving end, may be explicitly included in the scheduling allocation information.

As a value indicating the intensity of a channel, CQI indicates a reception SINR, which may be gained when the base station generally uses the PMI. The user equipment reports a CQI index, which indicates a specific combination from a group being configured of combinations of pre-decided modulation schemes and code rates, to the base station.

In a more advanced communication system, such as an LTE-A system, a feature of gaining (or acquiring) additional multi-user diversity by using MU-MIMO (multi-user MIMO) is added. As a technology having the base station allocates each antenna resource to other user equipments, the MU-MIMO technology corresponds to a scheduling method, which is performed by selecting a user equipment that is capable of a high speed data transmission rate for each antenna. In light of channel feedback, in order to acquire multi-user diversity gain, a higher level of precision is being required. This is because, since an interference channel between user equipment being multiplexed in an antenna domain exists in the MU-MIMO, the feedback channel level of precision significantly influences not only the user equipments, which transmit feedback, but also other user equipments, which are being multiplexed, with interference. Therefore, in the LTE-A system, in order to enhance the level of precision in the feedback channel, it has been decided to design the final PMI to be divided into W1, which corresponds to a long term and/or wideband PMI, and W2, which corresponds to a short term and/or sub-band PMI, and the final PMI may be decided by a combination of W1 and W2.

As an example of a hierarchical codebook transformation method, which configures one final PMI from two channel information, W1 and W2, and, as shown in Equation 1 below, the codebook may be converted by using a long-term covariance matrix of the channel.

$$W = \text{norm}(W1\,W2) \qquad [\text{Equation 1}]$$

Referring to Equation 1, W2 (=short term PMI) corresponds to a codeword of a codebook, which is configured to reflect short-term channel information, W1 indicates a long-term covariance matrix, and norm(A) signifies having a norm normalized to 1 for each column of matrix A. W represents a codeword of a final codebook, which is transformed, and detailed structure of the conventional W1 and W2 are shown below in Equation 2.

$$W1(i) = \begin{bmatrix} X_i & 0 \\ 0 & X_i \end{bmatrix}, \qquad [\text{Equation 2}]$$

where $X_i$ is $Nt/2$ by $M$ matrix.

$$W2(j) = \begin{bmatrix} e_M^k & e_M^l & \cdots & e_M^m \\ \alpha_j e_M^k & \beta_j e_M^l & & \gamma_j e_M^m \end{bmatrix} \; r\text{ columns}$$

(if rank = $r$), where $1 \leq k, l, m \leq M$ and $k, l, m$ are integer.

The codeword structure in Equation 2 uses a cross polarized antenna, and this structure corresponds to a structure, which is designed by reflecting correlation characteristics (or features) of a channel that occur when a distance between each antenna is dense (generally, a case when a distance between neighboring antennae is less than or equal to half of a signal wave). The cross polarized antenna may be divided into a horizontal antenna group and a vertical antenna group, and each group has the characteristics (or features) of a ULA (uniform linear array) antenna, and two antenna groups may be co-located. Therefore, the correlation between the antennae within each group has the characteristic of linear phase increment, and the correlation between each antenna group has the characteristic of phase rotation. Since the codebook eventually corresponds to a quantized value of a channel, the codebook is required to be designed by reflecting the characteristics of the corresponding channel to a source without any modification. For simplicity in the description, when a rank 1 codeword that is configured to have a structure shown in Equation 2 is given as an example, the structure of the rank 1 codeword is as shown below in Equation 3, and it may be verified that the channel characteristic has been reflected to a codeword satisfying Equation 2.

$$W1(i) * W2(j) = \begin{bmatrix} X_i(k) \\ \alpha_j X_i(k) \end{bmatrix}$$ [Equation 3]

In the Equation shown above, the codeword is expressed as a vector configured of Nt (number of transmission (Tx) antennae) number of rows and 1 column (Nt by 1), and the codeword has the structure of an upper vector $X_i(k)$ and a lower vector $\alpha_j X_i(k)$, and each vector shows the correlation characteristic between the horizontal antenna group and the vertical antenna group. It will be advantageous to express $X_i(k)$ as a vector having linear phase increment by reflecting the correlation characteristic between the antennae of each antenna group, and a DFT (Discrete Fourier Transform) matrix may be used as the most typical example.

Additionally, a greater level of channel accuracy is also required for CoMP. In case of CoMP JT, since multiple base stations cooperatively transmit the same data of a specific user equipment, theoretically, the CoMP JT may be considered as a MU-MIMO having antennae geologically distributed. More specifically, even in case of performing MU-MIMO is a JT, just as in a single cell MU-MIMO, a high level of channel accuracy is also required in order to avoid interference between user equipments that are co-scheduled. In case of CoMP CB, also, accurate channel information is being required in order to avoid interference caused by a neighboring cell to a serving cell.

Meanwhile, in the recent 3GPP LTE-A system, as a method for coordinating interference between base stations, research is being extensively and actively performed with respect to eICIC (enhanced Inter-Cell Interference Coordination). As an Interference coordination method, a cell causing interference may each be referred to as an aggressor cell or a primary Cell, and a cell receiving the interference may be defined as a victim cell or a secondary Cell, and, in this method, the aggressor cell stops (or discontinues) data transmission in a portion of a specific resource area, so that the user equipment can maintain its access to the victim cell or secondary cell in the corresponding resource area. More specifically, the aggressor cell uses a silent subframe, which reduces transmission power/activity of a portion of a physical channel (including an operation of setting power to 0), and, based upon this fact, the victim cell may schedule the user equipment, so as to be capable of performing time domain intercell interference coordination. The silent frame may also be referred to as an ABS (almost blank subframe). In this case, in light of a user equipment positioned within the victim cell, the interference level may vary significantly in accordance with the presence or absence of the silence subframe, and, in light of a user equipment positioned at a boundary between the aggressor cell and the victim cell, the signal transmitted from each cell may act as interference to one another.

In this situation, in order to perform more accurate RLM (radio link monitoring) or RRM (radio resource management) operations for measuring RSRP (Reference Signal Received Power) or RSRQ (Reference Signal Received Quality), or in order to measure CSI for a more accurate link adaptation, it will be preferable that the above-described monitoring/measurement is limited to subframe sets having uniform interference characteristics.

In the 3GPP LTE system, limited RLM and RRM/CSI measurement are defined as shown below.

1) RLM (Radio Link Monitoring)

Downlink radio link quality may be monitored by a physical layer of the user equipment for the purpose of indicating 'out-of-sync' status or 'in-sync' status to an upper layer.

In case of a non-DRX (discontinuous reception) mode operation, the physical layer within the user equipment monitors the radio link quality by comparing a value, which is measured during a previous time interval for each radio frame, and a threshold value (Qout and Qin). Conversely, in a DRX mode operation, the physical layer within the user equipment monitors the radio link quality by comparing a value, which is measured at least once during a previous time interval for each DRX (Discontinuous Reception) section (or interval), and a threshold value (Qout and Qin). Herein, when specific subframes are indicated in order to perform radio link monitoring having limited upper layer signaling, apart from the indicated subframes, the radio link quality is not monitored in other subframes.

In case the radio link quality is poorer than the threshold value (Qout) within the radio frames each having its radio link quality evaluated, the physical layer within the user equipment indicates 'out-of-sync' to the upper layer. More specifically, the 'out-of-sync' indication corresponds to an event that occurs when the channel quality is degraded to a predetermined level or below, after the user equipment measures a signal transmitted from the serving base station. Herein, the channel quality may be measured by using an SNR (Signal-to-Noise Ratio), which is measured by using a cell-specific reference signal (CRS) among the downlink signals transmitted from the base station. Alternatively, the 'out-of-sync' indication may be provided to an upper layer, when demodulation of a PDCCH, which is received by a lower layer (physical layer), is impossible, or when SINR (Signal-to-Interference plus Noise Ratio) is low.

In case the radio link quality is better than the threshold value (Qin) within the radio frames each having its radio link quality evaluated, 'in-sync' is indicated to the upper layer. More specifically, the 'in-sync' indication corresponds to an event that occurs when the channel quality is increased to a predetermined level or higher, after the user equipment measures a signal transmitted from the serving base station.

2) CQI (Channel Quality Indicator)

CQI corresponds to information indicating channel quality. CQI may be expressed as a pre-decided MCS combination. CQI indexes may be given as shown below in Table 2.

Table 2 represents a table respective to CQI indexes.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |

TABLE 2-continued

| CQI index | modulation | code rate × 1024 | efficiency |
|---|---|---|---|
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 3 represents a PDSCH transmission method for CSI reference resources.

TABLE 3

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity Closed-loop spatial multiplexing with up to 8 layer transmission, ports 7-14 (see subclause 7.1.5B) |

Referring to Table 2, the CQI index is expressed as 4 bits (i.e., CQI indexes 0 to 15), and each CQI index represents a corresponding modulation scheme and a corresponding code rate.

In a 3GPP LTE/LTE-A system, in order to allow the user equipment to calculate a CQI index from the CSI reference resource, it is defined to consider the following assumptions.

(1) First 3 OFDM symbols of one subframe are occupied by control signal (2) Resource elements, which are used by a primary synchronization signal, a secondary synchronization signal, or a physical broadcast channel (PBCH), do not exist.

(3) CP length of a non-MBSFN subframe (4) Redundancy Version is equal to 0.

(5) In case of a CSI report in Transmission Mode 9, when the user equipment sets up a PMI/RI report, a DMRS overhead is identical to a rank that has most recently been reported.

(6) Resource elements, which are allocated for CSI-RS and zero-power CSI-RS, do not exist.

(7) Resource elements, which are allocated for PRS (Positioning Reference Signal), do not exist.

(8) The PDSCH transmission scheme follows transmission mode, which is currently set up with respect to the user equipment (which may correspond to a Default mode), is given as shown in Table 3.

(9) When a CRS is used for channel measurement, with the exception for $\rho_A$, a PDSCH EPRE (Energy Per Resource Element) to cell-specific reference signal EPRE ratio is as given ($\rho_A$ may follow the following assumption. When the user equipment is set up to Transmission Mode 2 respective to a configuration of 4 cell-specific antenna ports, or when the user equipment is set up Transmission Mode 3 respective to a configuration of 4 cell-specific antenna ports and a respective RI being equal to 1, with respect to an arbitrary modulation scheme, $\rho_A = P_A + \Delta_{offset} + 10 \log_{10}(2)$ [db]. In other cases, with respect to an arbitrary modulation scheme and an arbitrary number of layers, $\rho_A = P_A + \Delta_{offset}$ [db]. $\Delta_{offset}$ is given by a nomPDSCH-RS-EPRE-Offset parameter, which is set up by an upper layer signaling.)

The assumption that has been made as described above signifies that the CQI not only includes information on channel quality but also includes diverse information on the corresponding user equipment. More specifically, even if the channel quality is the same, since different CQI indexes may be fed-back depending upon the performance of the corresponding user equipment, a consistent reference is being defined.

Although the RLM/RRM measurement respective to the conventional (or generic) serving cell has been performed by using a CRS, since pre-coding is applied in a transmission mode using the DMRS (e.g., Transmission Mode 9), the performed measurement may be different from the measurement performed with respect to a link through which actual transmission is being performed. Therefore, in Transmission Mode 9, in case a PMI/RI reporting mode is set up, the user equipment performs channel measurement in order to calculate the CQI value based only upon a CSI reference signal. Conversely, in Transmission Mode 9, in case settings are made so that PMI/RI reporting cannot be performed, the user equipment performs channel measurement in order to perform CQI calculation based upon the CRS.

A process of having the user equipment identify the channel status and obtaining an appropriate MCS may be designed by using diverse methods in the aspect of realizing the user equipment. For example, the user equipment may calculate a channel status or a valid SINR (Signal-to-Interference plus Noise Ratio) by using a reference signal. Additionally, the channel status or valid SINR may be measured within a bandwidth of the entire system (also referred to as set S), or may be measured within a partial bandwidth (specific subband or specific RB). The CQI respective to the entire system bandwidth (set S) may be referred to as a WB (Wideband) CQI, and the CQI respective to a partial bandwidth may be referred to as an SB (Subband) CQI. The user may calculate a highest MCS based upon the calculated channel status or valid SINR. The highest MCS signifies an MCS, which has a transport block error rate that does not exceed 10% during the decoding, and which satisfies the assumption of the CQI calculation. The user equipment may decide the CQI index associated with the calculated MCS, and, then, the user equipment may report the decided CQI index to the base station.

A CSI Reference Resource for CSI feedback/report is defined in the LTE/LTE-A system. The CSI reference resource is defined as a group of downlink physical resource blocks (PRBs) corresponds to a frequency bandwidth, to which a CQI computed (or calculated) in the frequency domain is associated. And, in the time domain, the CSI reference resource is defined as a single downlink subframe n-nCQI_ref. Herein, n represents an uplink subframe index for transmitting/reporting a CSI.

In case of a periodic CSI report, among the values equal to 4 or more, the nCQI_ref has the smallest value corresponding to a valid downlink subframe. More specifically, in an uplink subframe for reporting a CSI, among the subframes corresponding to or prior to at least the fourth subframe, nCQI_ref corresponds to a valid downlink subframe that is closest to the uplink subframe for reporting the CQI. And, And, in case of an aperiodic CSI report, the CSI reference resource is the same as the valid downlink subframe, to which the corresponding CSI request is transmitted, within the uplink DCI format (e.g., DCI format 0). Additionally, in the aperiodic CSI report, in a downlink subframe n-nCQI_ref, in case the corresponding CSI request is transmitted within a random access response grant, the n_CQI_ref is equal to 4.

Additionally, in case a CSI subframe set ($C_{CSI,0}$, $C_{CSI,1}$) is set up in the corresponding user equipment by an upper layer, each CSI reference resource may be included in any one of the two subframe sets ($C_{CSI,0}$, $C_{CSI,1}$), however, the CSI reference resources may not be included in both subframe sets.

In order to validate the downlink subframe, i) the subframe corresponds to a downlink subframe for the corresponding user equipment, ii) in all cases excluding Transmission Mode 9, the subframe does not correspond to an MBSFN (Multicast-Broadcast Single Frequency Network) subframe, iii) in case a DwPTS length is less than or equal to a predetermined size in a special subframe of a TDD system, the subframe does not include a DwPTS field, iv) the subframe is not included in a measurement gap, which is set up for the corresponding user equipment, and vi) in case the user equipment is set up to have a CSI subframe set in a periodic CSI report, the subframe should correspond to an element of the CSI subframe set, which is associated to the periodic CSI report. Conversely, in case a valid downlink subframe for CST reference resource does not exist, the CSI report is omitted in uplink subframe n.

3) RRM (Radio Resource Management)

The measurement for the RRM may be broadly divided into RSRP (Reference Signal Received Power), RSRQ (Reference Signal Received Quality), and so on, and RSRQ may be measured through a combination of RSRP and an E-UTRA carrier RSSI (Received Signal Strength Indicator).

RSRP (Reference Signal Received Power) is defined as a linear mean (or average) value respective to power distribution of resource elements having cell-specific reference signals (CRSs) transmitted thereto within a measurement frequency band. In order to decide the RSRP, a cell-specific reference signal corresponding to antenna port '0' (R0) may be used. Additionally, order to decide the RSRP, a cell-specific reference signal corresponding to antenna port '1' (R1) may be additionally used. In case reception diversity is used by the user equipment, the reported value may not be smaller than the corresponding RSRP of individual diversity branches. The measurement frequency band and the number of resource elements, which are used by the user equipment in order to decide the RSRP, may be decided by the user equipment within a range that satisfies the corresponding measurement accuracy requirements. Additionally, the power per resource element may be decided by an energy, which is received by a portion of a symbol excluding the cyclic prefix (CP).

RSRQ (Reference Signal Received Quality) is defined by an NxRSRP/(E-UTRA carrier RSSI (Received Signal Strength Indicator)). Herein, N signifies a number of resource blocks (RBs) of an E-UTRA carrier RSSI measurement band. Additionally, in the above-described equation, measurements of a numerator and a denominator may be calculated from the same resource block (RB) set.

The E-UTRA carrier RSSI measurement band includes a linear mean value (or average value) respective to a total reception power, which is detected from all sources including a serving cell and a non-serving cell of a co-channel, neighboring channel interference, thermal noise, and so on, within OFDM symbols including the reference signal corresponding to antenna port '0' throughout N number of resource blocks within the measurement band. Conversely, in case specific subframe for performing RSRQ measurement are being indicated by upper layer signaling, RSSI is measured through all OFDM symbols within the indicated subframes. In case reception diversity is used by the user equipment, the reported value may not be smaller than the corresponding RSRP of the individual diversity branch.

2. Method for Transmitting and Receiving a Signal in Accordance with a Full Duplex Time Division Duplex Mode of the Base Station The present invention proposes a method of a base station for transmitting and receiving a signal in accordance with a full duplex Time Division Duplex (TDD) mode by using multiple subframe configurations with respect to a single cell.

As described above with reference to FIG. 2, the related art TDD system is operated by dividing the time resource into uplink and downlink, and (b) of FIG. 2 shows an example of a frame structure according to a 3GPP LTE TDD system.

More specifically, the user equipment or base station of the related art TDD system transmits and receives a signal in accordance with a half duplex mode from a single carrier. Herein, the half duplex mode refers to a mode wherein the base station or the user equipment performs only one of transmission and reception of a signal at a specific time point. As shown in each subframe configuration of Table 1, at a specific point, downlink operations (signal transmission of the base station and signal reception of the user equipment) are performed within the entire cell, or uplink operations (signal transmission of the user equipment and signal reception of the base station) are performed within the entire cell. In such half duplex time division duplex mode, since the base station or user equipment do not perform transmission and reception of a signal at the same time, it may be advantageous in cost and design convenience.

Conversely, the full duplex time division duplex (TDD) mode corresponds to one device performing transmission and reception of a signal at the same time at a single time point. When using the full duplex TDD mode, an application range of the radio resource may be more extended, as compared to when using the half duplex TDD mode. However, in order to realize the full duplex TDD mode, the problem of self-interference should be resolved.

Figure 6:
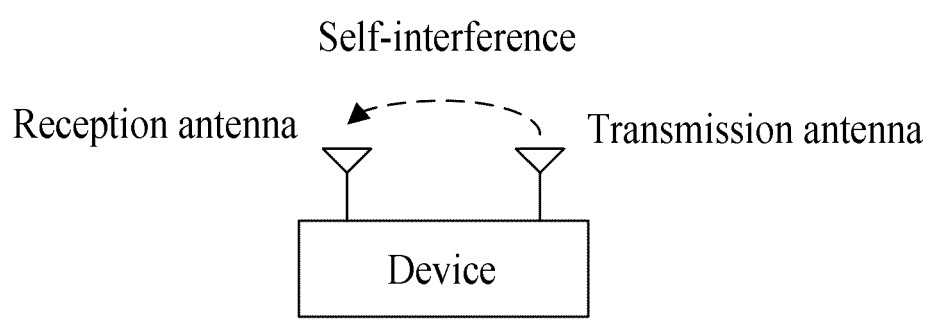
FIG. 6 illustrates an example of self-interference in accordance with a full-duplex time division duplex mode.

FIG. 6 illustrates an example of self-interference in accordance with a full-duplex time division duplex mode.

As shown in FIG. 6, self-interference refers to a signal transmitted by a specific device acting as interference on a signal received by the specific device. A method of separating the transmission antenna from the reception antenna of the device, a method of having the device remove (or cancel) its transmitted signal from its receive signal, and so on, may be given as examples of method for removing (or cancelling) the self-interference.

In case of performing the full duplex TDD mode through the method for removing self-interference, increased cost and complexity in the design may become a problem. Most particularly, in case of the user equipment, since the issues of fabrication cost and complexity in the design are considered as crucial factors, it will be difficult to apply the full-duplex TDD mode. Conversely, since the base station is more costly than the user equipment, and since a smaller number of base stations are used, the base station may be comparatively free from the fabrication cost and the complexity in the design.

Additionally, since the base station performs communication with multiple user equipments, in case the base station performs the full duplex TDD mode, it will be advantageous in that the degree of resource application of the entire cell is being increased.

Hereinafter, a method of the base station for transmitting and receiving a signal in accordance with a full-duplex TDD mode at a single carrier frequency, and for providing communication to a user equipment transmitting and receiving a signal in accordance with a half duplex TDD mode, will hereinafter be provided in detail.

FIG. 7 illustrates a signal transmission and reception of the full duplex time division duplex mode of a base station according to an exemplary embodiment of the present invention.

Referring to (a) of FIG. 7, the base station may transmit a downlink signal to a first user equipment at a first time point and may, at the same time, receive an uplink signal from a second user equipment. Additionally, referring to (b) of FIG. 7, the base station may receive an uplink signal from the first user equipment at a second time point and may, at the same time, transmit a downlink signal from the second user equipment. More specifically, the base station may transmit a signal to a user equipment and may, at the same time, receive a signal from a user equipment.

In order to perform the full duplex TDD mode, the base station should schedule the user equipment, which is included in the cell. At this point, as described above with reference to FIG. 6, self-interference may occur. For example, in case the first user equipment and the second user equipment are located close to one another, the uplink signal of the second user equipment may act as strong interference on the downlink signal of the first user equipment, thereby causing difficulty in receiving the downlink signal of the first user equipment. Therefore, when transmitting and receiving signals in accordance with the full duplex TDD mode, the first user equipment and the second user equipment may be scheduled to be located at remote distances from one another.

Additionally, in order to transmit and receive a signal of the full duplex TDD mode, the base station may reduce the power of the transmission signal. In the example of FIG. 7, even if the base station can remove (or cancel) the self-interference, in case the power transmission of a downlink signal is very large, even after the removal (or cancellation) of the self-interference, a portion of the self-interference may remain, thereby causing a problem in the reception of the uplink signal. Therefore, when transmitting and receiving signals in accordance with the full duplex TDD mode, self-interference may be alleviated by reducing the transmission power of a downlink signal. In case of reducing the transmission power of a downlink signal, it is preferable for the base station to transmit a downlink signal to a user equipment that is neighboring (or near) the base station. Moreover, in case the user equipment can receive only a signal respective to a general transmission power, the base station may not be capable of reducing the transmission power of a physical channel or signal. In this case, the base station may regulate in advance whether or not to perform reduction of the transmission power respective each physical channel or signal, or the base station may notify an upper layer signal, such as RRC, to the user equipment.

Figure 8:
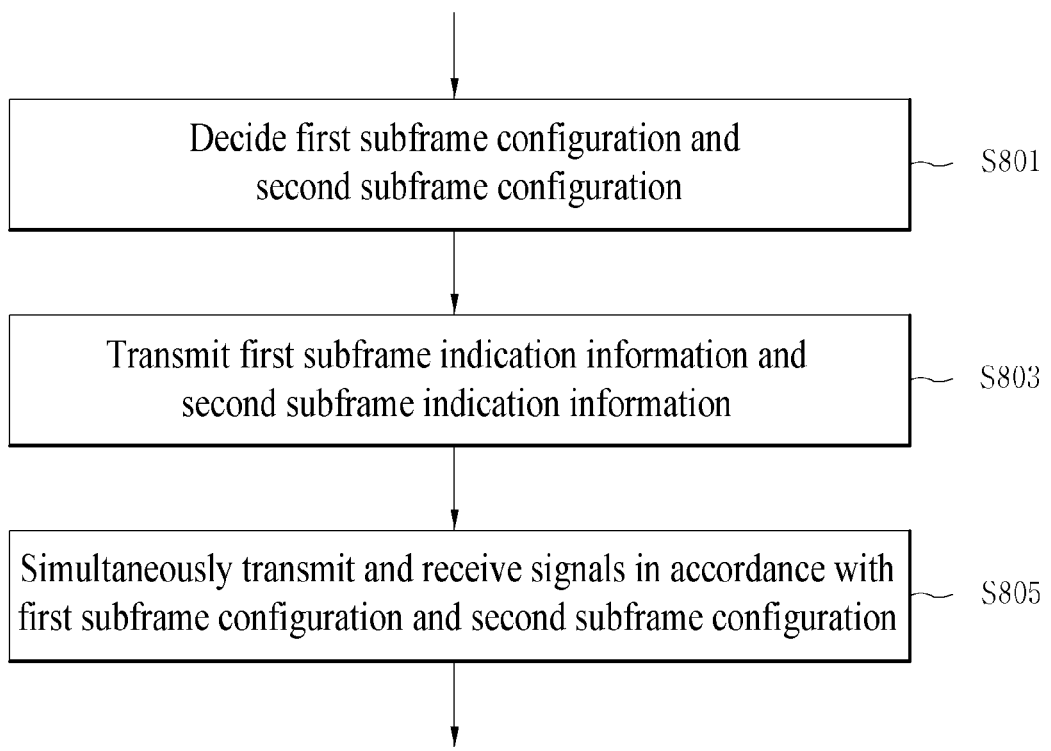
FIG. 8 illustrates a flow chart showing a method of the base station for transmitting and receiving a signal of the full duplex time division duplex mode according to an exemplary embodiment of the present invention.

FIG. 8 illustrates a flow chart showing a method of the base station for transmitting and receiving a signal of the full duplex time division duplex mode according to an exemplary embodiment of the present invention.

Referring to FIG. 8, among the multiple subframe configurations that operate in a single carrier frequency, the base station may decide a first subframe configuration being allocated to a first user equipment and a second subframe configuration being allocated to a second user equipment (S801).

More specifically, a base station operating in the full duplex TDD mode may configure a cell in a single carrier frequency and may use multiple subframe configurations. For example, among the uplink-downlink subframe configurations of Table 1, the first subframe configuration may be allocated to the first user equipment, and the second subframe configuration may be allocated to the second user equipment. At this point, in a subframe having at least the first subframe configuration and the second subframe configuration included therein, signal transmission directions of the first user equipment and the second user equipment may be configured differently. More specifically, in at least one subframe, a signal is transmitted to the first user equipment and a signal is received from the second user equipment at the same time, or a signal is received from the first user equipment and a signal is transmitted to the second user equipment at the same time. As described above, in a subframe having transmission directions configured differently, since the first user equipment and the second user equipment operate within a single cell, the base station operates in the full duplex TDD mode. At this point, in the subframe configuration, all subframes may be decided as downlink subframes, or all subframes may be decided as uplink subframes.

Subsequently, the base station transmits information respectively indicating first subframe configuration and second subframe configuration to the first user equipment and the second user equipment (S803).

At this point, although each user equipment transmits and receives a signal in accordance with the subframe configuration, in at least one subframe, the first user equipment and the second user equipment may have the respective signal transmission direction decided differently.

Thereafter, in at least one subframe, the base station receives a signal from the first user equipment in accordance with the first subframe configuration and transmits a signal to the second user equipment in accordance with the second subframe configuration at the same time (S805).

Additionally, the base station may also transmit a signal to the first user equipment in accordance with the first subframe configuration and may receive a signal from the second user equipment in accordance with the first subframe configuration at the same time. More specifically, in at least one subframe, the base station operates in the full duplex TDD mode.

As described above, when the base station uses multiple subframe configurations, considerations should be made so that a legacy user equipment, which operates by using a single subframe configuration, can be operated without any problems. Therefore, among the multiple subframe configurations, at least one subframe configuration may be decided identically as the subframe configuration that is notified to the legacy user equipment. For example, a subframe configuration that is being transmitted through a system information block (SIB) may be decided as a subframe configuration for the legacy user equipment. At this point, the subframe configuration being transmitted through a system information block may be referred to as a primary configuration, and the primary configuration may be assigned with a higher priority as compared to other subframe configurations (also referred to as secondary configurations).

As an example of the priority level being assigned to the primary configuration, the user equipment according to the secondary configuration may be set to perform radio resource measurement (RRL) or measurement of radio link monitoring (RLM), and so on, only in a subframe, which is designated as a downlink subframe in the primary configuration. In order to increase uplink data reception rate from the legacy user equipment, a subframe, which is designated as an uplink subframe in the primary configuration, may decrease power of a signal that is being transmitted to the user equipment according to the secondary configuration. In this case, since an error may occur when the user equipment according to the secondary configuration performs radio resource measurement or radio link monitoring, the above-described priority level may be assigned.

Furthermore, in case of channel state information (CSI) measurement, it is preferable to separate measurement and report for each subframe configuration. As described above, when the base station transmits and receives signal in the full duplex TDD mode, this is because the signal can be transmitted by reducing the transmission power of the signal. Therefore, subframes that are all configured as downlink subframes in both the first subframe configuration and the second subframe configuration may be decided as a first subframe group, and subframes that are configured as downlink subframes in only one of the first subframe configuration and the second subframe configuration may be decided as a second subframe group. More specifically, the channel state information (CSI) measurement and feedback may be separately performed by separating the first subframe group and the second subframe group from one another.

Figure 9:
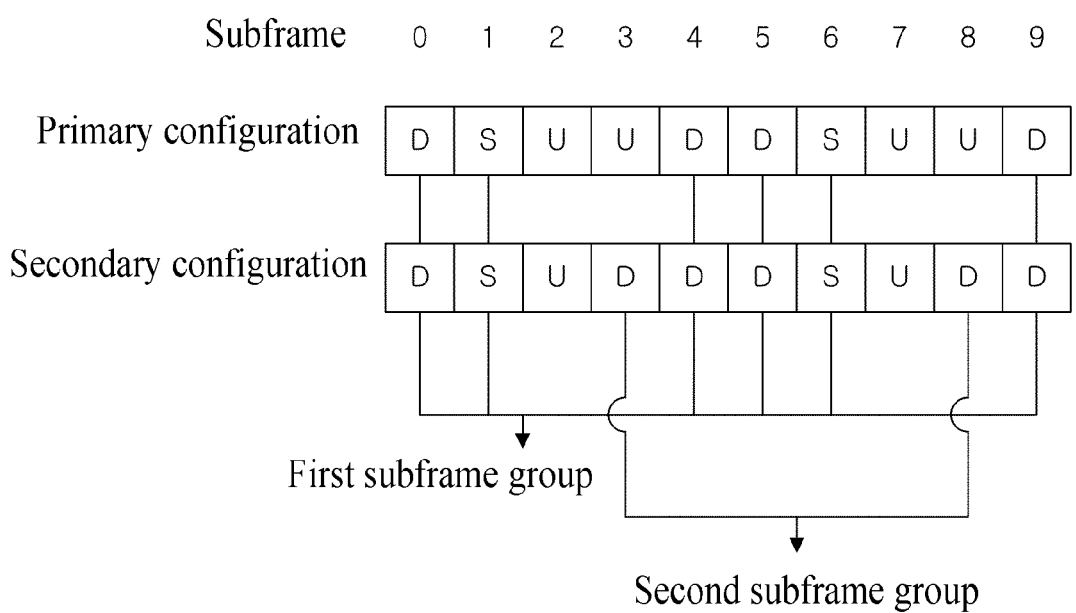
FIG. 9 illustrates an example of a first subframe group and a second subframe group.

FIG. 9 illustrates an example of a first subframe group and a second subframe group. Referring to FIG. 9, an example of deciding the first subframe configuration as Subframe Configuration 1 of Table 1 and deciding the second subframe configuration as Subframe Configuration 2 of Table 1 is shown. At this point, subframes 0, 1, 4, 5, 6, and 9, which are all configured as downlink subframes in both the first subframe configuration and the second subframe configuration, may be decided as the first subframe group. Additionally, subframes 3 and 8, which are set up as downlink subframes in the first subframe configuration yet set up as uplink subframes in the second subframe configuration, may be decided as the second subframe group. By separately measuring and feeding-back the CSI, each of the first subframe group and the second subframe group may accurately measure the CSI even if a difference in the transmission power of the signal exists. As shown in FIG. 9, even if a subframe is set up as an uplink subframe in the primary configuration, if the corresponding subframe is set up as a downlink subframe in the secondary configuration, since the corresponding subframe should have its CSI measured, in performing the CSI measurement, the user equipment should assume that this subframe is a valid CSI reference resource and then perform calculation of the CSI. The above-described operation of deciding the validity of a CSI reference resource according to the secondary configuration may be applied when calculating a CSI respective to a second subframe group, which is configured as an uplink subframe at least in the primary configuration yet configured as a downlink subframe in the secondary configuration.

Similarly, uplink transmission power of the user equipment may also be separated into a subframe group, which is configured as uplink subframes in both the first subframe configuration and the second subframe configuration, and a subframe group, which is configured as uplink subframes in only one subframe configuration.

Additionally, consistent limitations may exist in the designation of uplink subframes in the secondary configuration. For example, the secondary configuration may decide only the subframes, which are designated as uplink subframes in the primary configuration, may be decided as the uplink subframes. In case the secondary configuration decides the subframes, which are designated as downlink subframes in the primary configuration, as uplink subframes, when the transmission power of downlink signals according to the primary configuration is reduced for the user equipment according to the secondary configuration, the decrease in the transmission power may influence the signal measurement of the legacy user equipment.

Moreover, the base station may include an indicator indicating a subframe configuration in a DCI format, which delivers scheduling information, and may transmit the processed DCI format to the user equipment through a PDCCH. The user equipment may be capable of knowing the subframe configuration, which is allocated to the user equipment, among the multiple subframe configurations, through the received indicator. Since a control time respective to HARQ for transmitting and receiving PDSCH/PUSCH (e.g., time relation between a scheduling message and data transmission, time relation between data transmission and ACK/NACK transmission, and so on) is decided in accordance with the subframe configuration, the user equipment should be aware (or informed) of the allocated subframe configuration.

Furthermore, the above-described technical features may be applied not only to the full duplex TDD mode but also to the half duplex TDD mode.

Meanwhile, the base station configure multiple cells in a single carrier frequency, and, by differently setting up the subframe configuration for each cell, the base station may transmit and receive signals in the full duplex TDD mode. At this point, the multiple cells may correspond to a carrier aggregation format of the 3GPP LTE system. More specifically, a base station may configure multiple cells each having a cell identifier (ID) in multiple carrier frequencies, and a user equipment may transmit and receive signals for each cell. In this case, also, the multiple cells may be divided into primary cells and secondary cells, and some of the information of the primary cell may be shared with the secondary cell. For example, information for timing synchronization of the primary cell, PBCH, CRS, CSI-RS, and so on, may be with the secondary cell.

In this case, by receiving the shared information only from the primary cell, the user equipment may save resources of the secondary cell. For example, after the user equipment performs synchronization by using a PSS (Primary Synchronization Signal) and an SSS (Secondary Synchronization Signal) of the primary cell, the secondary cell may be decided to have the same timing synchronization as the primary cell. As another example, the secondary cell does not transmit a separate PBCH, and the user equipment receives only the PBCH of the primary cell, and MIB (Master Information Block) information of the secondary cell may be transported (or delivered) through a separate channel (e.g., an upper layer signal, such as RRC, and so on). As yet another example, the secondary cell does not transmit at least one of the separate CRS and CSI-RS, and the user equipment measures RRM/RLM/CSI that are received from the primary cell, however, by indicating a difference in the transmission power between the primary cell and the secondary cell, the measurement result respective to the secondary cell may be reported.

Additionally, in order to configure (or set up) multiple subframes, the base station may deactivate a portion of the subframe belonging to the secondary cell. For example, in a subframe, wherein both the primary cell and the secondary cell correspond to the downlink, since scheduling and PDSCH transmission may be performed through the primary cell, the secondary cell may be deactivated. This case is advantageous in that the secondary cell is not required to be cell search and that blind decoding is not required to be performed. Therefore, in case both the primary cell and the secondary cell correspond to downlink, the downlink subframe of the secondary cell may be deactivated. Moreover, in this case, also, in case the primary cell performs cross scheduling on the PDSCH of the secondary cell, the downlink subframe of the secondary cell may not be deactivated.

Meanwhile, the base station may use a frame format of an FDD (Frequency Division Duplex), e.g., frame structure type 1 of a 3GPP LTE system, and, herein, the base station may configure a downlink band and an uplink band in a single carrier frequency. In this case, the base station may have a frame structure simultaneously performing signal transmission of a downlink and signal reception of an uplink within the subframe. However, since the legacy user equipment is uninformed of the above-described structure, the full duplex mode may be limited in some of the subframes for the legacy user equipment. For example, the base station may divide the subframes to even numbers and odd numbers with respect to the indexes, and, in an even-numbered subframe for the legacy user equipment, an uplink signal may not be received when transmitting a downlink signal. More specifically, by reducing the transmission power of the downlink signal when receiving an uplink signal only in the odd-numbered subframe, the signal may be transmitted and received in the full duplex mode. The base station may transmit information indicating the subframe, in which the reduction of the downlink signal transmission power is being performed, to the user equipment, so that the user equipment can use the received information in signal demodulation or channel state information feedback.

3. General Description of a Device to which the Present Invention May be Applied FIG. 10 illustrates a block view showing a structure of a wireless communication device according to an exemplary embodiment of the present invention.

Figure 10:
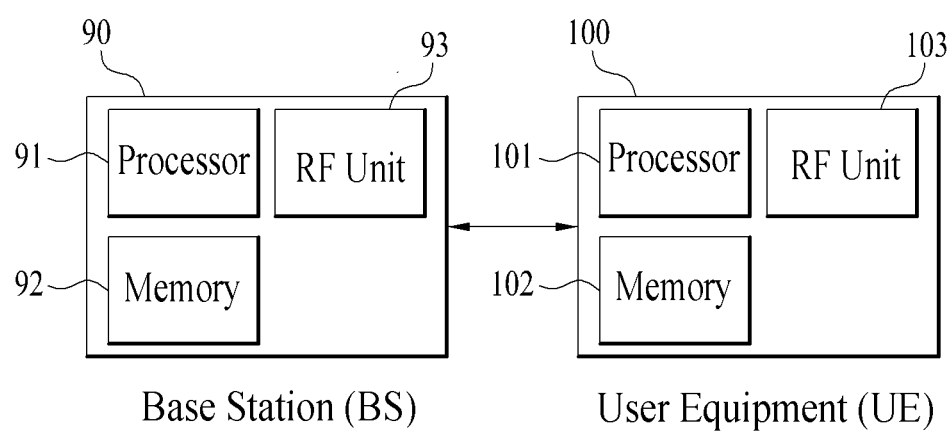
FIG. 10 illustrates a block view showing a structure of a wireless communication device according to an exemplary embodiment of the present invention.

Referring to FIG. 10, a wireless communication device includes a base station (90) and multiple user equipments (100) located within the base station (90) area.

The base station (90) includes a processor (91), a memory (92), and an RF module (93). The processor (91) realizes the proposed functions, procedures, and/or methods. Layer of the wireless interface protocol may be realized by the processor (91). The memory (92) is connected to the processor (91) and stores diverse information for operating the processor (91). The RF unit (93) is connected to the processor (91) and transmits and/or receives radio signals.

The user equipment (100) includes a processor (101), a memory (102), and an RF module (103). The processor (101) realizes the proposed functions, procedures, and/or methods. Layer of the wireless interface protocol may be realized by the processor (101). The memory (102) is connected to the processor (101) and stores diverse information for operating the processor (101). The RF unit (103) is connected to the processor (101) and transmits and/or receives radio signals.

The memory (92, 102) may be provided inside or outside of the processor (91, 101) and may be connected to the processor (91, 101) through diverse well-known means. Furthermore, the base station (90) and/or the user equipment (100) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a method for transmitting data in a wireless communication system of the present invention is described based upon an example that can be applied to a 3GPP LTE system, the method of the present invention may also be applied to a variety of other radio access system in addition to the 3GPP LTE system.

What is claimed is:

1. A method for transmitting and receiving a signal by using a Time Division Duplex (TDD) mode in a wireless access system, the method performed by a base station and comprising:
    deciding a first subframe configuration allocated to a first user equipment and a second subframe configuration allocated to a second user equipment, among multiple subframe settings operating in a single carrier frequency;
    transmitting information respectively indicating the first subframe configuration and the second subframe configuration to the first user equipment and the second user equipment; and
    receiving a signal from the first user equipment with respect to the first subframe configuration and simultaneously transmitting a signal to the second user equipment with respect to the second subframe configuration.

2. The method of claim 1, wherein information indicating the first subframe configuration is transmitted through a system information block (SIB) and is provided to a legacy user equipment.

3. The method of claim 2, wherein the radio resource measurement (RRL) and radio link monitoring (RLM) are set up to be performed only in a subframe designated as a downlink subframe in the first subframe configuration.

4. The method of claim 2, wherein the second subframe configuration is decided as an uplink only in a subframe decided as an uplink in the first subframe configuration.

5. The method of claim 1, wherein the step of transmitting a signal to the second user equipment comprises:
    reducing transmission power of a signal being transmitted to the second signal.

6. The method of claim 1, further comprising:
    removing interference caused by a signal being transmitted to the second user equipment to interfere with a signal being received from the first user equipment.

7. The method of claim 6, wherein the step of removing interference comprises:
    reducing a signal being transmitted to the second user equipment from a signal received from the first user equipment.

8. The method of claim 1, wherein the step of transmitting information comprises:
    including an indicator indicating one of the first subframe configuration and the second subframe configuration to downlink control information (DCI) and transmitting the processed information.

9. The method of claim 1, further comprising:
    transmitting a signal to the first user equipment with respect to the first subframe configuration and simultaneously receiving a signal from the second user equipment with respect to the second subframe configuration.

10. The method of claim 1, further comprising:
    performing scheduling so as to position the first user equipment and the second user equipment at remote distances from one another.

11. The method of claim 1, further comprising:
    deciding subframes being set up as downlink in both the first subframe configuration and the second subframe configuration as a first subframe group;
    deciding subframes being set up as downlink in any one of the first subframe configuration and the second subframe configuration as a second subframe group; and
    transmitting information indicating channel state information measurement to be separately performed in the first subframe group and the second subframe group to the first user equipment and the second user equipment.

12. A base station to transmit and receive a signal by using a Time Division Duplex (TDD) mode in a wireless access system, the base station comprises:
    an RF (Radio Frequency) unit configured to transmit and receive a radio signal; and
    a processor configured to control the base station including the RF unit,
    wherein the processor is configured to:
    decide a first subframe configuration allocated to a first user equipment and a second subframe configuration allocated to a second user equipment, among multiple subframe settings operating in a single carrier frequency,
    transmit information respectively indicating the first subframe configuration and the second subframe configuration to the first user equipment and the second user equipment, and
    receive a signal from the first user equipment with respect to the first subframe configuration and simultaneously transmit a signal to the second user equipment with respect to the second subframe configuration.

13. The base station of claim 12, wherein information indicating the first subframe configuration is transmitted through a system information block (SIB) and is provided to a legacy user equipment.

14. The base station of claim 13, wherein the radio resource measurement (RRL) and radio link monitoring (RLM) are set up to be performed only in a subframe designated as a downlink subframe in the first subframe configuration.

15. The base station of claim 13, wherein the second subframe configuration is decided as an uplink only in a subframe decided as an uplink in the first subframe configuration.

* * * * *